United States Patent [19]

Hecht et al.

[11] 3,946,203

[45] Mar. 23, 1976

[54] OPTICAL READER FLUORESCENCE CONTROL

[75] Inventors: Richard M. Hecht, Dallas; William B. Wiegman, Richardson, both of Tex.

[73] Assignee: Recognition Equipment Incorporated, Irving, Tex.

[22] Filed: June 26, 1974

[21] Appl. No.: 483,307

[52] U.S. Cl. .... 235/61.11 E; 250/568; 340/146.3 B
[51] Int. Cl.² ............................................ G06K 7/12
[58] Field of Search ............ 250/458, 226, 566, 568; 340/146.3 B, 146.3 F; 235/61.11 E, 61.12 N, 61.12 R; 346/74 P

[56] References Cited
UNITED STATES PATENTS

| | | | |
|---|---|---|---|
| 2,780,731 | 2/1957 | Miller | 250/458 |
| 3,059,112 | 10/1962 | Rogal | 250/568 |
| 3,105,908 | 10/1963 | Burkhardt | 250/566 |
| 3,473,027 | 10/1969 | Freeman | 340/146.3 B |
| 3,654,463 | 4/1972 | Geusic | 250/458 |
| 3,812,325 | 5/1974 | Schmidt | 340/146.3 B |
| 3,832,555 | 8/1974 | Ohnishi | 250/458 |

*Primary Examiner*—Daryl W. Cook
*Assistant Examiner*—Robert M. Kilgore
*Attorney, Agent, or Firm*—Richards, Harris & Medlock

[57] ABSTRACT

A method and system for improving the signal-to-noise ratio in an automatic electro-optical reader of bar codes, wherein fluorescent ink bars arranged in coded configurations on a document are excited by a narrow band of visible radiation in the blue region of the electromagnetic spectrum, and an adjacent but not overlapping visible red region of the spectrum emanating from the ink bars is optically focused onto a light sensitive detector.

16 Claims, 7 Drawing Figures

OPTICAL READER FLUORESCENCE CONTROL

This invention relates to bar code readers, and more particularly to improvement in the signal-to-noise ratio of an automatic reading operation by control of the wavelength of excitation of fluorescent materials relative to the wavelength of emissions by the fluorescent materials.

Bar code readers are provided to sense the presence or absence of bars recorded on financial documents where the documents are moved past a reading station at speeds ranging up to 400 inches per second. The bars in the form of short fluorescent ink strips may appear at intervals of the order of a 1/32 inch center to center. Fluorescent ink or other fluorescent substances must be excited by energy of lower wavelength than the emission energy wavelengths. Fluorescent energy emitted from a surface which has fluorescent ink deposited on it consists not only of fluorescent ink emission but also fluorescent emissions from extraneous fluorescent substances on the surface or in the materials forming the document. Most documents contain some substances which fluoresce. Thus, the problem of providing a high signal-to-noise ratio is a significant one. Excitation energy wavelengths must be blocked or eliminated below the emission energy wavelength to allow separation between the excitation and emission wavelengths. Similarly, the emission energy wavelengths must be minimized on the low wavelength side to allow the separation. Heretofore, fluorescent ink bar code reading methods consisted of the use of fluorescent inkk excitation with ultraviolet energy and receiving fluorescent ink emissions by filtering and focusing the energy onto an aperture plate and then refocusing the energy onto a detector in the form of a photomultiplier tube. The first stage of bar code reading of the fluorescent ink duly excited was accomplished by energy of a low wavelength much lower than the fluorescent ink emission wavelength. This caused background emissions in the wavelength region between the excitation and the ink emission wavelengths as well as in the ink emission wavelength region. A background emission resulted which varied with the amount of extraneous fluorescent substances in or on the surface on which the bar codes were printed. Thus, a series of receiving filters and aperture plates with refocusing was employed.

Applicant has found that bar code reading can be optimized as to signal-to-noise ratio by the control of three features: the excitation frequency, the fluorescent emission frequency, and the photomultiplier spectral response curve. In accordance with the present invention, optimization of the fluorescent excitation is accomplished by fixing the excitation energy wavelength not in the ultraviolet region but in the blue light region which serves to lower the background emission from the surface on which the bar codes appear. More particularly, in accordance with the invention a light sensitive detector optically is focused to respond to light emanating from ink at a read station in the visible red portion of the electromagnetic spectrum. Means are then provided to excite the ink at the read station with radiation in a narrow visible band in the blue electromagnetic portion of the spectrum immediately below the red portion. Preferably the excitation radiation is in a narrow blue band which does not significantly overlap the narrow red band of fluorescent emanations from the excited ink.

In a more specific aspect, the source of a tungsten halogen lamp with a lens system which includes ultraviolet, infrared and blue filters to restrict the excitation frequency to a narrow pass band in the region of about 470 millimicrons wavelength.

For a more complete understanding of the present invention and for further objects and advantages thereof, reference may now be had to the following description taken in conjunction with the accompanying drawings in which.

Figure 1:
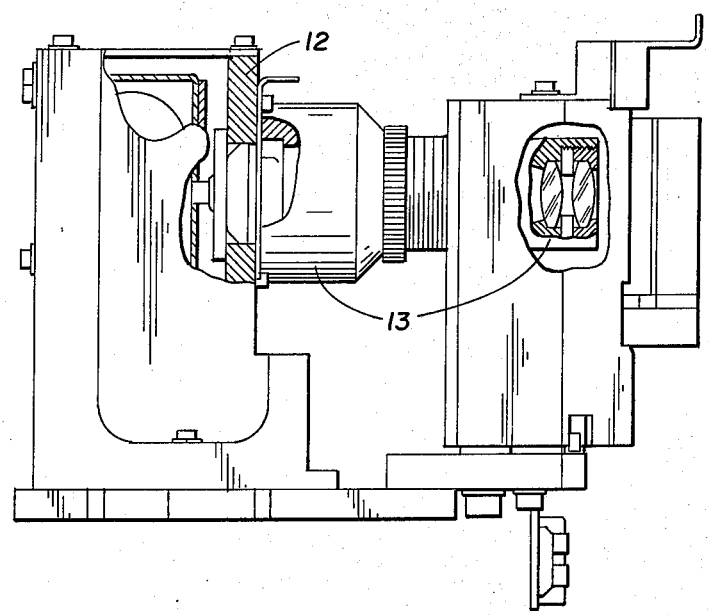
FIG. 1 is a side view of a light source-detector assembly embodying the present invention.

In FIG. 1, a photomultiplier tube 11 is mounted in a housing 12. Light from a drum surface is directed by means of a lens system 13 onto the photomultiplier tube 11. The present invention is involved with the reading of fluorescent ink bar codes on documents traveling at high speed. Thus, the present invention is directed particularly to supplying a desired illumination system for bar codes which are to be read as they travel past a reading station.

Figure 2:
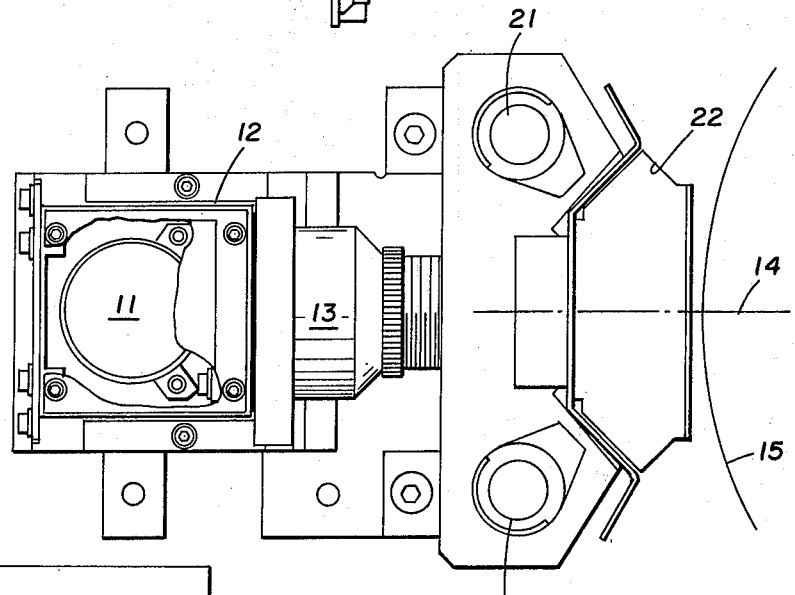
FIG. 2 is a top view of the unit of FIG. 1.

In FIG. 2, the photomultiplier tube, together with the reading lens system 13, are arrayed along an axis 14. Documents to be read are moved past the axis 14 on the surface of a drum 15 typically at a rate approaching 400 inch/second.

The present invention is directed to utilization of a particular band of excitation from the surface of documents on drum 15 such that the emitted energy detected by the photomultiplier tube 11 is enhanced over the background.

The present invention is directed to ultilization of a suitable light source. In accordance with this invention, a pair of tungsten halogen lamps 20 and 21 are mounted equidistant from the drum 15 along axes 20a and 21a that are approximately 90° apart. Excitation radiation thus impinges the surface of the drum 15 at approximately 45°. The invention involves the use of a lens system housed within the structure 22 such that the wavelengths of the incident radiation optimize for the wavelength of the emmission band of the fluorescent ink on the document. At the same time, the excitation must be of a wavelength substantially different from that emitted by the fluorescent materials in order to avoid detecting solely the light from sources 20 and 21.

Figure 3:
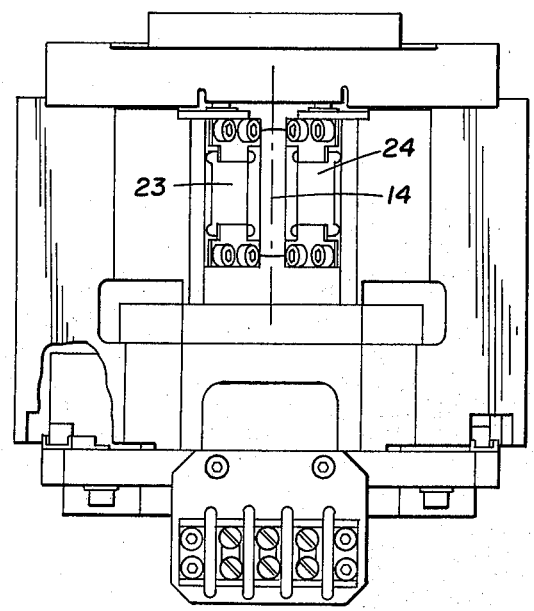
FIG. 3 is a front view of the unit of FIG. 1.

FIG. 3 is a front view of the system where the axis 14 is shown as a dot with the faces 23 and 24 of a suitable lens system embodying the present invention being visible.

In accordance with the present invention, the lens system employed with the tungsten halogen lamp light source is a filter system which causes the excitation radiation to be within a pass band which is optimized for excitation of the inks employed.

Figure 4:
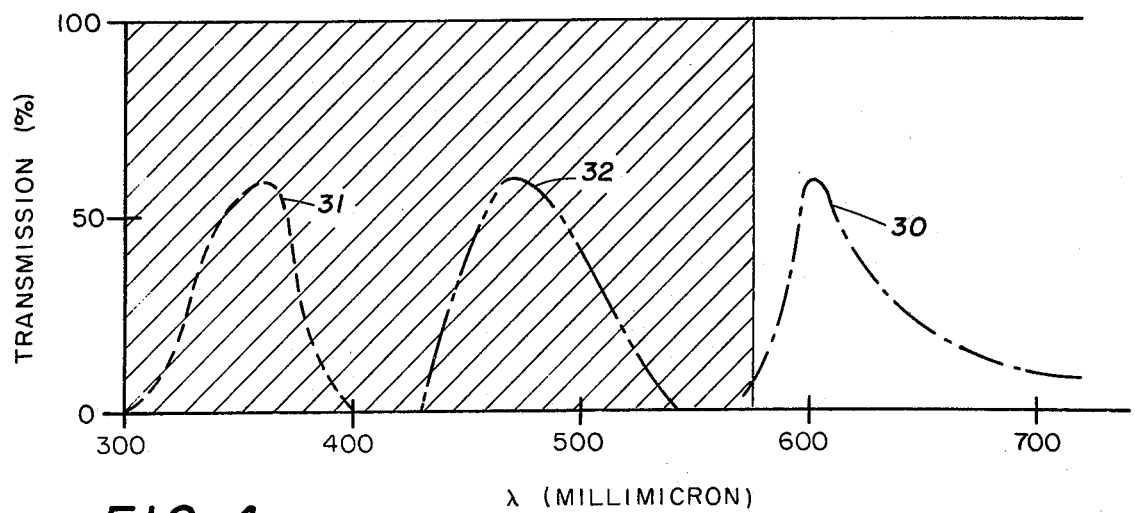
FIG. 4 is a plot of excitation and emitted radiation employed herein.

For example, in FIG. 4, there is illustrated a curve 30 which represents typical emission band for a suitable fluorescent ink used in bar code systems peaked at a wavelength of about 600 millimicrons. It will be noted that the emission is in the lower red region of the electromagnetic spectrum. Conventional sources of ultraviolet excitation radiation heretofore used are represented by the curve 31. This curve peaks at about 350 millimicrons wavelength. In accordance with the present invention, the light sources are so arranged that the excitation emission is of wavelength represented by curve 32 which peaks at about 470 millimicrons.

Figure 6:
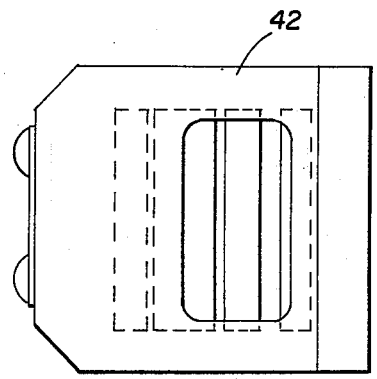
FIG. 6 is a top view of the lens system of FIG. 5.
Figure 7:
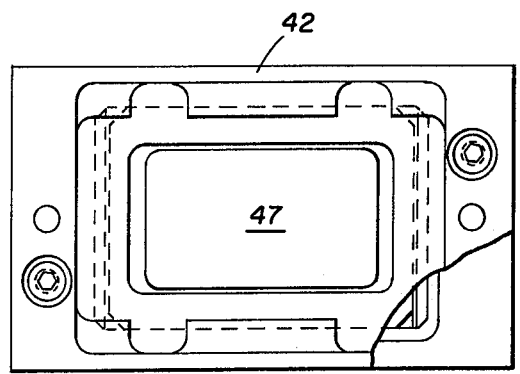
FIG. 7 is a front view of the lens system of FIG. 5.
Figure 5:
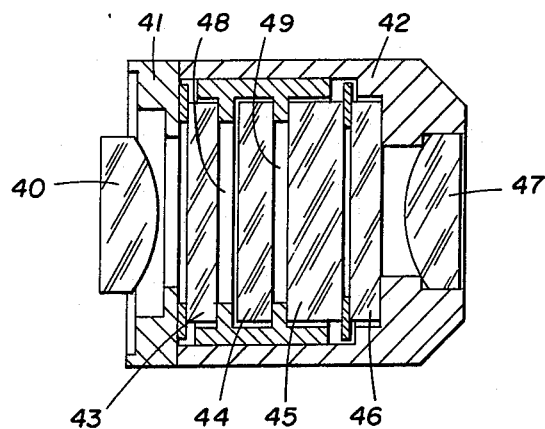
FIG. 5 is a sectional view of a lens system utilized in the present invention.

Such a pass band source is made possible through the use of the tungsten halogen lamps 20 and 21 and a lens system such as shown in FIGS. 5–7 positioned between each lamp and the read station. Each lens system includes a first cylindrical lens 40 which has its longitudinal axis parallel to the filament in the lamp 20. Lens 40 is mounted in a heat sink portion of the housing 12 which surrounds lamp 20. The curved portion of the cylindrical lens 40 extends into a housing section 41 of the lens system which provides for a mounting of the additional lens and filter elements on a heat resistant structure 42. The lens system then includes four filter plates 43–46 and an output cylindrical lens 47 mounted in housing 42. Housing 42 preferably is of a heat resistant material.

The first filter element 43 is an ultraviolet filter which serves to block passage of any ultraviolet light. Filter element 44 is an infrared absorbing filter. Element 44 absorbs heat. Element 44 is spaced substantially from filters 43 and 45 by gaps 48 and 49. A fan then is utilized to maintain coolant flow such as air through gaps 48 and 49 to remove heat from the infrared absorbing element 44.

Element 45 is a blue absorption filter. Element 45 serves to block passage of blue wavelengths but over a fairly wide band. Therefore, an interference filter 46 is employed in conjunction with filter 45 to narrow the pass band. Thus, the interference filter 46 serves to provide greater blocking of the high end of the blue portion of the spectrum. Lens 47 is a cylindrical lens whose axis is parallel to the axis of lens 40. Lens 40 serves to spread the light from lamp 20 to maximize use of the area of the filters 43–46. Lens 47 then serves to focus the light passing through the filters into a line at the read station on drum 15 on which the lens system 13 is focused.

Further improvement in the signal-to-noise ratio in operating the system thus far described was achieved by utilizing an ink and a photomultiplier tube having a response specially compatible with the emissions from such ink excited as above described. The preferred ink is manufactured and sold by Day-Glo Color Division Switzer Bros. Inc., Cleveland, Ohio 44103 and identified as Blaze Orange. This ink preferably is used with the photomultiplier tube manufactured and sold by RCA Tube Type No. 1P21-S4, i.e., an RCA tube having an S-4 photocathode.

In accordance with the invention, there is provided a method and system for enhancing the signal-to-noise ratio in an automatic reader of fluorescent bars recorded on a document. More particularly, a light source comprising a lens system is employed to restrict the radiation impinging the surface of the document to the visible blue region of the electromagnetic spectrum adjacent to but not overlapping a visible red region of the spectrum emanating from the ink bars. A light sensitive detector is optically focused to be responsive to the red region of radiation to diminish the effects of background emissions.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an automatic reader of information recorded on a document in fluorescent ink where the document is propelled at high speed past a reading station, the combination which comprises:

means to excite said ink at said read station with radiation in a first pass band of excitation energy in the blue portion of the electromagnetic spectrum;

a light sensitive detector at said read station; and means for optically focusing light in a second pass band in the visible red portion of the electromagnetic spectrum emanating from said ink onto said detector, said second pass band separate from the first pass band of said blue portion.

2. The combination set forth in claim 1 in which the said second pass band is centered at about 600 millimicrons wavelengths and said first pass band is centered at about 470 millimicrons.

3. The combination set forth in claim 1 in which the excitation means comprises a tungsten halogen lamp and a lens system to concentrate light from said lamp at said reading station with ultraviolet, infrared and the blue filters to provide a narrow pass band of excitation energy in the region of about 470 millimicrons wavelength.

4. The combination set forth in claim 3 in which said lens system includes a cylindrical spreading lens and a like cylindrical converging lens with said ultraviolet, infrared and blue filters therebetween.

5. The combination set forth in claim 3 in which an air space is provided on both faces of said infrared filter and wherein means are provided to maintain flow of coolant fluid to remove heat from said infrared filter.

6. A method of improving the signal-to-noise ratio in an automatic, electro-optical reader of bar codes recorded on a document in a flourescent ink, which comprises:

a. applying electromagnetic radiation to said document to excite fluorescent substances in said ink;

b. restricting wavelengths of excitation radiation to those within a first pass band in the visible blue region of the electromagnetic spectrum adjacent to but not overlapping the visible red region having a longer wavelength; and c. optically passing all radiation emanating from said ink in a second band pass in said red region separate from the first pass band in said blue region.

7. A system for minimizing the effect of background emissions in an automatic, electrooptical reader of fluorescent ink codes, which comprises:

a. a radiation source;

b. a first optical band-pass means interposed between said source and a reader station for focusing radiation in a first pass band of excitation energy in the blue portion of the electromagnetic spectrum upon ink codes to be read;

c. a light sensitive detector; and d. a second optical band-pass means located between said reader station and said detector for focusing energy in a second pass band in the visible red portion of the electromagnetic spectrum emanating from the ink codes at said reader station onto said detector.

8. The combination set forth in claim 7, wherein said radiation source is a tungsten halogen lamp.

9. The combination set forth in claim 8, wherein said first optical means comprises a cylindrical spreading lens adjacent to said source and a cylindrical converging lens adjacent to said reader station, with an ultraviolet filter, an infrared absorption filter, a wide band-pass blue absorption filter, and a narrow band-pass blue absorption filter interposed between said cylindrical lenses.

10. The combination set forth in claim 9 wherein said infrared filter is removed from said ultraviolet filter and said wide band-pass blue filter by air gaps through which air flows to remove heat from said infrared filter.

11. The combination set forth in claim 7 wherein said radiation source comprises a pair of tungsten halogen lamps mounted equidistant from an optical reading axis leading from said reader station to said detector.

12. The combination set forth in claim 11 wherein said first optical means comprises two identical filter systems, each interposed between one of said pair of lamps and said reader station to direct blue radiation toward said station.

13. The combination set forth in claim 7 wherein said detector is a photomultiplier tube.

14. The combination set forth in claim 7 wherein said first optical means is a narrow band-pass filter centered in the region of about 470 millimicrons wavelength.

15. The combination set forth in claim 7 wherein said second optical means is a band-pass filter which blocks the region below about 600 millimicrons wavelength.

16. In an automatic reader of information recorded on a document in fluorescent ink where the document is propelled at high speed past a reading station, the combination which comprises:

a light sensitive detector optically focused to respond to light emanating from said ink at said read station in the visible red portion of the electromagnetic spectrum centered about 600 millimicrons wavelength; and means to excite said ink at said read station with radiation in a narrow visible band in the blue electromagnetic spectrum centered at about 470 millimicrons and immediately below said red portion.

* * * * *